United States Patent
Min et al.

(10) Patent No.: US 10,282,044 B2
(45) Date of Patent: May 7, 2019

(54) TOUCH SENSING DEVICE AND DISPLAY DEVICE WITH A SWITCHING UNIT CONFIGURED TO RECEIVE NOISE FROM AN ELECTRODE

(71) Applicant: Samsung Display Co., Ltd., Yongin-si, Gyeonggi-do (KR)

(72) Inventors: Kyung Youl Min, Yongin-si (KR); Jeong Kyoo Kim, Yongin-si (KR); Seung Nam Park, Yongin-si (KR)

(73) Assignee: Samsung Display Co., Ltd. (KR)

( * ) Notice: Subject to any disclaimer, the term of this patent is extended or adjusted under 35 U.S.C. 154(b) by 168 days.

(21) Appl. No.: 15/238,422

(22) Filed: Aug. 16, 2016

(65) Prior Publication Data
US 2017/0075472 A1    Mar. 16, 2017

(30) Foreign Application Priority Data
Sep. 10, 2015  (KR) .......................... 10-2015-0128496

(51) Int. Cl.
*G06F 3/041*   (2006.01)
*G06F 3/044*   (2006.01)

(52) U.S. Cl.
CPC ............ *G06F 3/044* (2013.01); *G06F 3/0418* (2013.01)

(58) Field of Classification Search
CPC ...................................................... G06F 3/041
See application file for complete search history.

(56) References Cited

U.S. PATENT DOCUMENTS

| | | | |
|---|---|---|---|
| 9,886,133 B2 * | 2/2018 | Zhao | G06F 3/0418 |
| 2013/0271426 A1 * | 10/2013 | Yumoto | G06F 3/041 345/174 |
| 2014/0160057 A1 | 6/2014 | Lee et al. | |
| 2014/0247241 A1 * | 9/2014 | Heo | G06F 3/044 345/174 |
| 2014/0247243 A1 | 9/2014 | Heo | |
| 2015/0084923 A1 | 3/2015 | Kang | |
| 2015/0253926 A1 * | 9/2015 | Ota | G06F 3/0412 345/174 |
| 2015/0277660 A1 * | 10/2015 | Yang | G06F 3/0418 345/173 |

(Continued)

FOREIGN PATENT DOCUMENTS

| KR | 10-2012-0116789 A | 10/2012 |
|---|---|---|
| KR | 10-2013-0068551 A | 6/2013 |

(Continued)

*Primary Examiner* — Kent W Chang
*Assistant Examiner* — Nathaniel P Brittingham
(74) *Attorney, Agent, or Firm* — Innovation Counsel LLP (57) ABSTRACT

Disclosed is a touch sensing device, including: a touch panel unit including first electrodes and second electrodes; a driving unit configured to generate a driving signal for detecting a change in capacitance within the touch panel unit; a switching unit configured to transmit the driving signal generated by the driving unit to any one of the first electrodes of the touch panel unit, and receive noise from another one of the first electrodes of the touch panel unit; a noise sensing unit configured to sense the noise received from the switching unit; and a touch sensing unit configured to detect a touch position based on detection signals received through the second electrodes of the touch panel unit and the noise sensed by the noise sensing unit.

11 Claims, 5 Drawing Sheets

(56) References Cited

U.S. PATENT DOCUMENTS

| | | | |
|---|---|---|---|
| 2016/0147319 A1* | 5/2016 | Agarwal | G06F 3/0418 345/173 |
| 2016/0216835 A1* | 7/2016 | Takaba | G06F 3/044 |
| 2017/0075472 A1* | 3/2017 | Min | G06F 3/0418 |
| 2017/0102826 A1* | 4/2017 | Hamaguchi | G06F 3/0418 |
| 2018/0329555 A1* | 11/2018 | Kim | G09G 3/3208 |

FOREIGN PATENT DOCUMENTS

| | | |
|---|---|---|
| KR | 10-2014-0076041 A | 6/2014 |
| KR | 10-2014-0110167 A | 9/2014 |
| KR | 10-2015-0034046 A | 4/2015 |

* cited by examiner

TOUCH SENSING DEVICE AND DISPLAY DEVICE WITH A SWITCHING UNIT CONFIGURED TO RECEIVE NOISE FROM AN ELECTRODE

CROSS-REFERENCE TO RELATED APPLICATION

This application claims priority to and the benefit of Korean Patent Application No. 10-2015-0128496, filed on Sep. 10, 2015, in the Korean Intellectual Property Office, the entire contents of which are incorporated herein by reference in their entirety.

BACKGROUND

1. Field

The present inventive concept relates to a touch sensing device, and a display device including the same.

2. Description of the Related Art

A display device, such as a Liquid Crystal Display (LCD), an Organic Light Emitting Diode (OLED) display, and an electrophoretic display, includes an electric field generating electrode and an electric-optical active layer. The LCD includes a liquid crystal layer as an electro-optical active layer, and the OLED display includes an organic emission layer as an electro-optical active layer, and the electrophoretic display includes particles with charges. The electric field generating electrode may be connected to a switching element, such as a thin film transistor, to receive a data signal, and the electro-optical active layer converts the data signal into an optical signal to display an image.

Recently, the display device may have a touch sensing function interactive with a user, in addition to a function of displaying an image. According to the touch sensing function, when a user writes a character or draws a picture using a finger, a touch pen, or the like, a display device senses a change in pressure applied to the screen, charges, light, and the like, so that contact information, such as whether an object approaches or is in contact with the screen and a position of the contact, is recognized. The display device may receive an image signal based on the contact information and display an image.

The touch sensing function may be implemented through a touch sensor. The touch sensor may be classified into various types, such as a resistive type, a capacitive type, an electro-magnetic (EM) type, and an optical type.

For example, the capacitive type touch sensor may include a sensing capacitor formed of a sensing electrode which is capable of transmitting a sensing signal, and may recognize whether a contact is generated, a position of the contact, and the like by detecting a change in capacitance of the sensing capacitor generated when a conductor, such as a finger, approaches the sensor.

However, when noise, other than the sensing signal, is input through the touch sensor, it is difficult to accurately sense contact information and a position of the contact.

SUMMARY

The present inventive concept provides a touch sensing device which is capable of more accurately performing a touch sensing operation by decreasing an influence by noise.

The present inventive concept provides a display device including a touch sensing device which is capable of more accurately performing a touch sensing operation by decreasing an influence by noise.

An exemplary embodiment of the present inventive concept provides a touch sensing device, including: a touch panel unit including first electrodes and second electrodes; a driving unit configured to generate a driving signal for detecting a change in capacitance within the touch panel unit; a switching unit configured to transmit the driving signal generated by the driving unit to any one of the first electrodes of the touch panel unit, and receive noise from another one of the first electrodes of the touch panel unit; a noise sensing unit configured to sense the noise received from the switching unit; and a touch sensing unit configured to detect a touch position based on detection signals received through the second electrodes of the touch panel unit and the noise sensed by the noise sensing unit.

The switching unit may sequentially supply the driving signal generated by the driving unit to the first electrodes within the touch panel unit.

The switching unit may receive the noise through the first electrode which is not supplied with the driving signal among the first electrodes of the touch panel unit.

The switching unit may receive the noise through a first electrode adjacent to a first electrode which is supplied with the driving signal.

The switching unit may receive the noise through a first electrode right after the first electrode which is supplied with the driving signal.

The switching unit may receive the noise through a first electrode right before the first electrode which is supplied with the driving signal.

The noise sensing unit may include a first integration circuit and a second integration circuit which are serially connected with the switching unit.

The first integration circuit and the second integration circuit may reverse a polarity of a noise signal transmitted through the switching unit.

The first integration circuit and the second integration circuit may include a first operational amplifier and a second operational amplifier, respectively.

The noise signal transmitted through the switching unit may be transmitted to an inverted input terminal of the first operational amplifier, and a signal output through an output terminal of the first operational amplifier is transmitted to an inverted input terminal of the second operational amplifier.

The touch sensing unit may include a plurality of third operational amplifiers connected to the second electrodes, respectively, inverted input terminals of the plurality of third operational amplifiers are connected to the corresponding second electrodes, and non-inverted input terminals of the plurality of third operational amplifiers are connected to an output terminal of the second operational amplifier of the noise sensing unit.

Output terminals of the plurality of third operational amplifiers may be connected to a respective Analog-to-Digital Converter (ADC).

Another exemplary embodiment of the present inventive concept provides a display device, including: touch screen panel including first electrodes and second electrodes; a driving unit configured to generate a driving signal for detecting a change in capacitance within the touch screen panel: a switching unit configured to transmit the driving signal generated by the driving unit to any one of the first electrodes of the touch screen panel, and receive noise from another one of the first electrodes of the touch screen panel; a noise sensing unit configured to sense the noise received from the switching unit; and a touch sensing unit configured to detect a touch position based on detection signals received through the second electrodes of the touch screen panel and the noise sensed by the noise sensing unit.

The switching unit may connect any one of the first electrodes which is not supplied with the driving signal to the noise sensing unit.

The touch sensing unit may include a plurality of first operational amplifiers connected to the second electrodes, respectively, and wherein inverted input terminals of the plurality of the first operational amplifiers are connected to the corresponding second electrodes, and non-inverted input terminals of the plurality of the first operational amplifiers are connected to an output terminal of the noise sensing unit.

The noise sensing unit may include a first integration circuit and a second integration circuit which are serially connected with the switching unit.

The first integration circuit and the second integration circuit may include a second operational amplifier and a third operational amplifier, respectively.

The noise received from another one of the first electrodes may be supplied to an inverted input terminal of the second operational amplifier, and a signal output through an output terminal of the second operational amplifier is supplied to an inverted input terminal of the third operational amplifier.

According to the exemplary embodiment of the present inventive concept, it is possible to provide the touch sensing device which is capable of more accurately performing a touch sensing operation by decreasing an influence by noise.

Further, according to the exemplary embodiment of the present inventive concept, it is possible to provide the display device including a touch sensing device which is capable of more accurately performing a touch sensing operation by decreasing an influence by noise.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, exemplary embodiments of the present inventive concept will be described in detail with reference to the accompanying drawings. In this case, it should be noted that the same elements will be designated by the same reference numerals in the accompanying drawings. In the description below, it should be noted that only parts necessary for understanding operations according to various exemplary embodiments of the present inventive concept will be described, and descriptions of other parts may be omitted so as to avoid unnecessarily obscuring the subject matter of the present inventive concept. However, the present inventive concept is not limited to the exemplary embodiments described herein, and may be implemented in various different forms. However, the exemplary embodiments described herein are provided so as to describe the present inventive concept in detail so that those skilled in the art may easily carry out the technical spirit of the present inventive concept.

Figure 1:
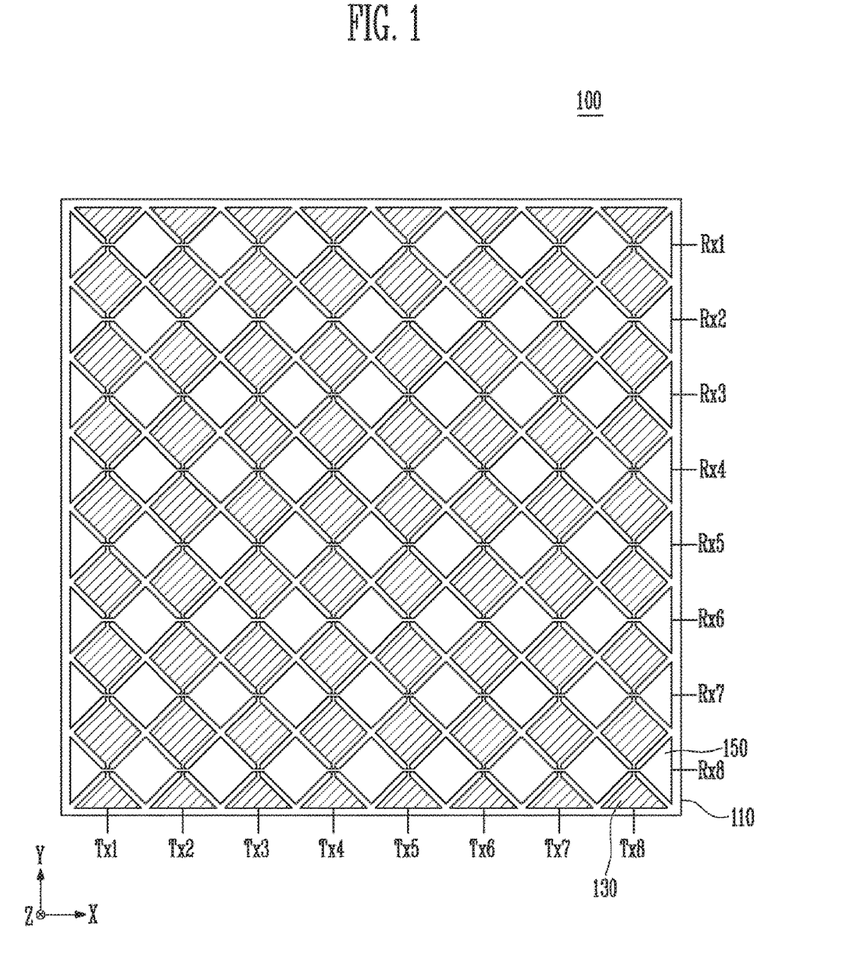
FIG. 1 is a diagram illustrating a touch panel unit included in a general touch sensing device.

FIG. 1 is a diagram illustrating a touch panel unit included in a general touch sensing device.

Referring to FIG. 1, a general touch panel unit 100 includes a substrate 110, and a plurality of sensing electrodes 130 and 150 provided on the substrate 110. Although not illustrated in FIG. 1, each of the plurality of sensing electrodes 130 and 150 may be electrically connected with a wiring pattern of a circuit board attached to one end of the substrate 110 through wires and a bonding pad. The circuit board 110 is mounted with a controller integrated circuit to detect sensing signals generated by the plurality of sensing electrodes 130 and 150, and determine a touch input based on the detected sensing signal.

The substrate 110 may be a transparent substrate so that the sensing electrodes 130 and 150 are formed, and may be formed of a plastic material, such as polymethylmethacrylate (PI), polyethyleneterephthalat (PET), and polycarbonate (PC), or tempered glass. A predetermined peripheral area for visually shielding the wires which are generally formed of an opaque metal material may be formed in an area, in which the wires connected with the sensing electrodes 130 and 150 are provided, other than the areas, in which the sensing electrodes 130 and 150 are formed.

The plurality of sensing electrodes 130 and 150 may be provided on one surface or both surfaces of the substrate 210, and in a case of a touch screen device, the plurality of sensing electrodes 130 and 150 may be formed of an indium-tin oxide (ITO), an indium zinc oxide (IZO), a zinc oxide (ZnO), a carbon nano tube (CNT), a graphene-based material, and the like, which are transparent and have conductivity. FIG. 1 illustrates the sensing electrodes 130 and 150 having a rhombus or diamond shape pattern, but the sensing electrodes 130 and 150 may have patterns of various shapes, such as a rectangle and a triangle.

The plurality of sensing electrodes 130 and 150 includes the first electrode 130 extending in a Y-axis direction and the second electrode 150 extending in an X-axis direction. The first electrode 130 and the second electrode 150 may be provided on both surfaces of the substrate, or provided on different substrates and cross each other, and when all of the first electrode 130 and the second electrode 150 are provided on one surface of the substrate 110, a predetermined insulating layer may be partially formed at a crossing point of the first electrode 130 and the second electrode 150.

A device, which is electrically connected with the plurality of sensing electrodes 130 and 150 and senses a touch input, detects a change in capacitance generated by a touch input in the plurality of sensing electrodes 130 and 150 and senses the touch input based on the detected change in capacitance. The first electrode 130 may be connected to channels defined as Tx1 to Tx8 in the controller integrated circuit to receive a predetermined driving signal, and the second electrode 150 may be connected to channels defined as Rx1 to Rx8 and be used to detect a sensing signal by a contact sensing device.

In this case, the controller integrated circuit may detect a change in mutual-capacitance generated between the first electrode 130 and the second electrode 150 as the sensing signal, and may be operated by a method of sequentially applying a driving signal to each first electrode 130 and simultaneously detecting a change in capacitance by the second electrode 150. That is, when m first electrodes 130 and n second electrodes 150 are provided, the controller integrated circuit may detect a total of m×n capacitance change data for determining a touch input.

FIG. 1 illustrates the 8×8 touch panel unit 100, in which the number of input channels is 8, that is, Tx1 to Tx8, and the number of reception channels is 8, that is, Rx1 to Rx8, but the number of input channels and the number of reception channels may be variously changed depending on an exemplary embodiment.

Figure 2:
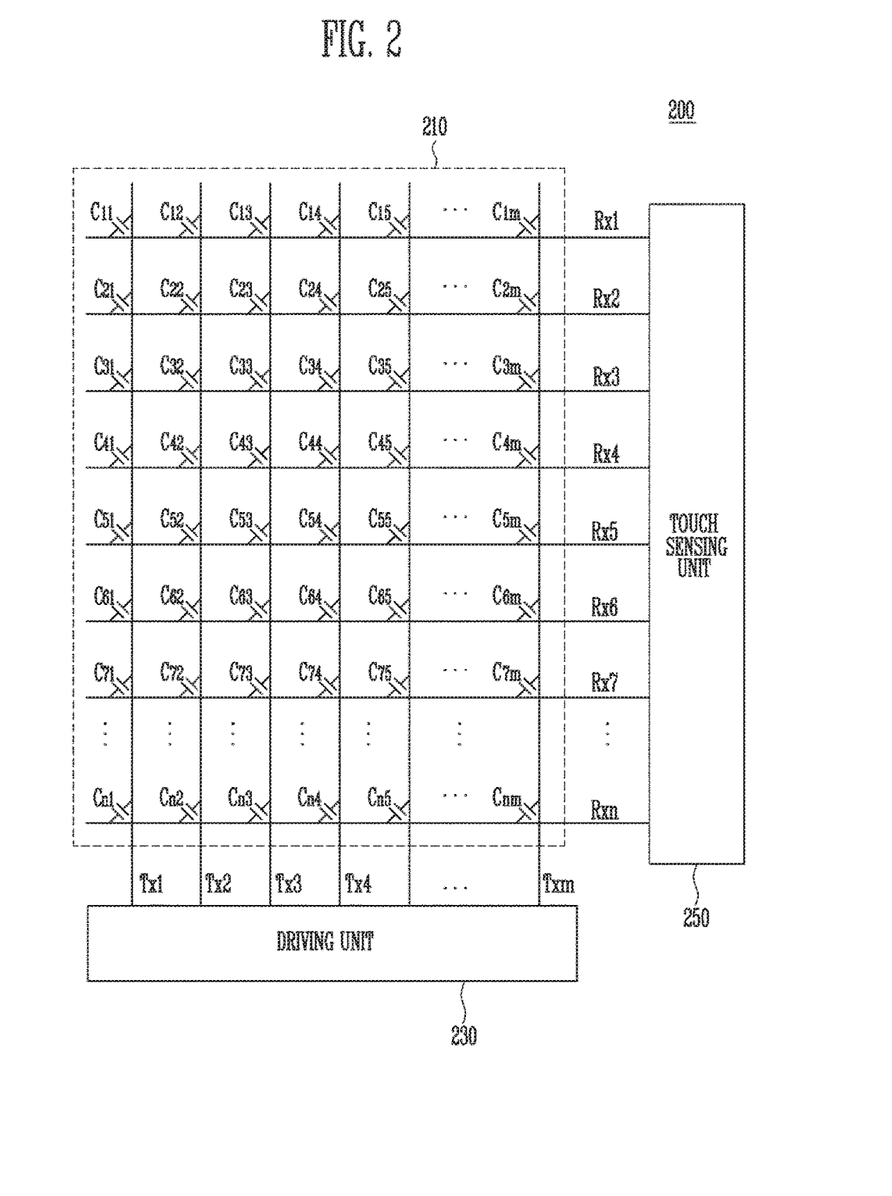
FIG. 2 is a block diagram illustrating a general touch sensing device.

FIG. 2 is a block diagram illustrating a general touch sensing device.

Referring to FIG. 2, a general touch sensing device 200 includes a touch panel unit 210, a driving unit 230, and a touch sensing unit 250. The touch panel unit 210 includes m first electrodes Tx1 to Txm extending in a first axis direction, that is, a vertical direction of FIG. 2, and n second electrodes Rx1 to Rxn extending in a second axis direction crossing the first axis, that is, a horizontal direction of FIG. 2, and capacitor C11 to Cnm are formed at a plurality of nodes at which the first electrodes cross the second electrodes. The capacitance changes in the capacitors C11 to Cnm may be mutual-capacitance changes generated by driving signals applied to the first electrodes Tx1 to Txm by the driving unit 230. In the meantime, the driving unit 230 and the touch sensing unit 250 may be implemented as one controller integrated circuit (IC) chip.

The driving unit 230 applies a predetermined driving signal to the first electrodes Tx1 to Txm of the touch panel unit 210. The driving signal may be a square wave, a sine wave, a triangle wave, and the like having a predetermined cycle and a predetermined amplitude, and may be sequentially applied to each of the plurality of first electrodes Tx1 to Txm. The driving unit 230 may be configured so that a circuit for generating and applying the driving signal is individually provided in each of the first electrodes Tx1 to Txm, and may be configured so that one driving signal generating circuit is provided, and the driving signal is applied to each of the plurality of first electrodes Tx1 to Txm by using a switching circuit. Further, when the touch sensing device 200 is a device which only senses whether or not a touch input is entered, the driving unit 230 may simultaneously apply the driving signal to all of the first electrodes Tx1 to Txm or selectively apply the driving signal to some of the first electrodes Tx1 to Txm.

The touch sensing unit 250 may include an integration circuit for sensing the capacitance changes in the capacitors C11 to Cmn generated at the plurality of nodes, and the integration circuit may be connected to the plurality of second electrodes Rx1 to Rxn. The integration circuit may include at least one operational amplifier and a capacitor having a predetermined capacity, and an inverted input terminal of the operational amplifier may be connected with the second electrodes Rx1 to Rxn and convert the capacitance changes in the capacitors C11 to Cmn into analog signals, such as voltage signals, and output the analog signals. When the driving signal is sequentially applied to each of the plurality of first electrodes Tx1 to Txm, the touch sensing unit 250 may simultaneously detect the capacitance change from the plurality of second electrodes Rx1 to Rxn, so that the integration circuits may be provided as many as the number n of second electrodes Rx1 to Rxn.

Although not illustrated in FIG. 2, the touch sensing device may further include a signal converting unit and a calculating unit, in addition to the touch panel unit 210, the driving unit 230, and the touch sensing unit 250. The signal converting unit may generate a digital signal using an analog signal generated by the integration circuit. For example, the signal converting unit may include a Time-to Digital Converter (TDC) circuit which measures a time of arrival of an analog signal in a form of a voltage output by the touch sensing unit 250 to a predetermined reference voltage level and converts the measured time into a digital signal, or an Analog-To-Digital Converter (ADC) circuit which measures the amount of change of a level of an analog signal output by the touch sensing unit 250 for a predetermined time, and converts the measured amount of change into a digital signal. Further, the calculating unit may determine a touch input applied to the touch panel unit 210 by using the digital signal. For example, the calculating unit may determine the number, coordinates, and gesture operations of touch inputs applied to the touch panel unit 210. The digital signal which is the basis for determining a touch input by the calculating unit may be data obtained by digitizing the capacitance changes in the capacitors C11 to Cnm, and particularly, may be data indicating a difference in capacitance between a case where a touch input is not generated and a case where a touch input is generated. Typically, in the capacitive sensing device, it may be represented that capacitance of an area which is in contact with a conductive object is decreased compared to that of an area, in which a contact is not generated. The signal converting unit and the calculating unit may also be separately implemented from the touch sensing unit 250, and may also be implemented while being integrated with the touch sensing unit 250 according to an exemplary embodiment.

Figure 3:
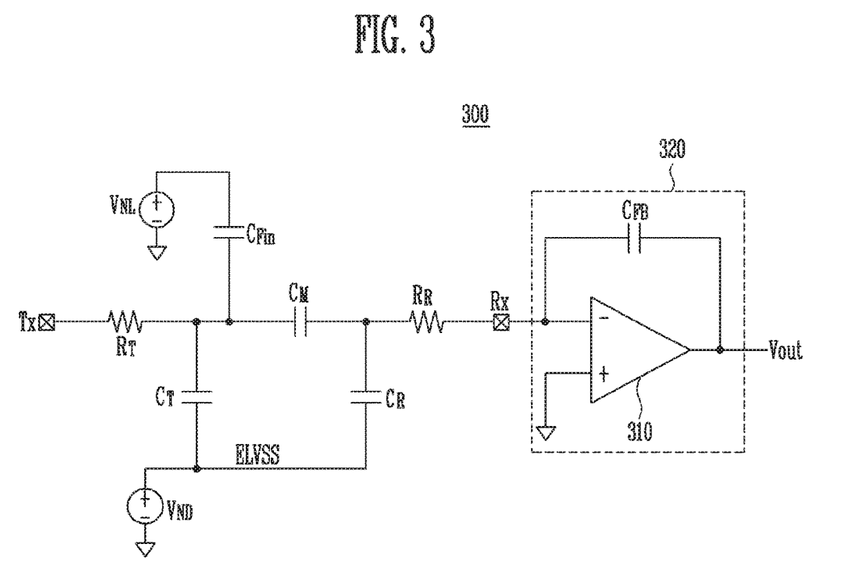
FIG. 3 is an equivalent circuit diagram illustrating a path of a driving signal in the touch panel unit of FIG. 2.

FIG. 3 is an equivalent circuit diagram illustrating a path of a driving signal in the touch panel unit of FIG. 2.

Referring to FIG. 3, when a specific position of the touch panel unit is touched, a path of a signal passing through mutual capacitance in a touch position is illustrated as an equivalent circuit diagram 300. In the equivalent circuit diagram 300 of FIG. 3, Tx represents a terminal connected with the driving unit as the first electrode, RT is a resistance component of the first electrode corresponding to the touch position, CM is mutual capacitance between the first electrode and the second electrode corresponding to the touch position, and RR represents a resistance component of the second electrode corresponding to the touch position. Further, CT represents capacitance between the entire first electrodes corresponding to the touch position and driving power ELVSS line, and CR represents capacitance between the entire second electrodes corresponding to the touch position and the driving power ELVSS line. CFin represents capacitance additionally formed when a person touches the corresponding position, and VNL indicates a noise component input by an application of a touch. Further, VND represents a noise component input through a display device when the touch panel unit is combined with a display panel (for example, an LCD panel or an OLED panel) of the display device.

The operational amplifier 310 and a feedback capacitor CFB form the integration circuit 320, and the integration circuit receives a driving signal input into the first electrode Tx. A non-inverted input of the operational amplifier 310 may be grounded, and an inverted input may be connected to any one of the second electrodes Rx1 to Rxn serving as the sensing channels within the touch panel unit. CM is present between the first electrode Tx and the integration circuit 320. Further, $CF_{in}$ is connected to one end of CM when the touch is input, so that the capacitance between the first electrode Tx and the integration circuit is changed, and the integration circuit may generate an analog signal Vout corresponding to the change in the capacitance. Although not illustrated in FIG. 3, as described with reference to FIG. 2, an output terminal of the integration circuit 320 may be connected with an ADC circuit, and the ADC circuit may convert the output signal Vout that is an analog signal of the integration circuit into a digital signal.

The equivalent circuit 300 will be described in more detail with reference to FIG. 2. For example, when a position C23 is touched in the touch panel unit 210, CM of FIG. 3 may correspond to C23, and RT may correspond to a resistance component formed by Tx3 between the driving unit 230 and the position C23. Further, RR of FIG. 3 may correspond to a resistance component formed by Rx2 between the position C23 and the touch sensing unit 250. In the meantime, CT may correspond to a capacitance component formed between Tx3 and the driving power ELVSS line, and CR may correspond to a capacitance component formed between Rx2 and the driving power ELVSS line. The inverted input terminal of the operational amplifier 310 may be connected with the second electrode Rx2.

In this case, the output voltage Vout may be expressed by Equation (1) below.

$$(CM+\Delta CM) \times VTX + (CR \times VND) + (CF_{in} \times VNL) = CFB \times \Delta Vout \quad \text{Equation (1)}$$

Here, VTX represents a voltage value of a driving signal input through the driving channel Tx. Further, ACM represents a change amount of mutual capacitance and ΔVout represents a change amount of an output of the integration circuit including the operational amplifier 310 and the feedback capacitor CFB.

As can be seen through Equation (1), when a load of the touch panel unit is large, that is, values of CT, CR, and the like are large, a proportion of a noise component value among the entire Vout components is increased, so that a Signal to Noise Ratio (SNR) of Vout is decreased. Particularly, due to a panel noise VND input from the display panel, the SNR is degraded. In the meantime, a saturation phenomenon in which a noise charge generated by the noise is integrated in the feedback capacitor CFB, so that the output voltage Vout reaches a supply voltage of the operational amplifier 310 may be generated. In this case, the touch sensing unit may be erroneously operated. When capacitance of the feedback CFB is increased in order to solve the problem, a value of ΔVout is decreased, so that the saturation phenomenon is not generated, but the signal level is decreased, so that there is a problem in that an output voltage for sensing a touch is also decreased.

The touch sensing device according to the exemplary embodiment of the present inventive concept detects noise from the first electrode Tx and applies the detected noise to the touch sensing unit, and the touch sensing unit subtracts the detected noise from the signal received from the reception electrode Rx, thereby preventing a saturation phenomenon while improving an SNR. The touch sensing device according to the exemplary embodiment of the present inventive concept will be described below with reference to FIGS. 5 and 6.

Figure 4:
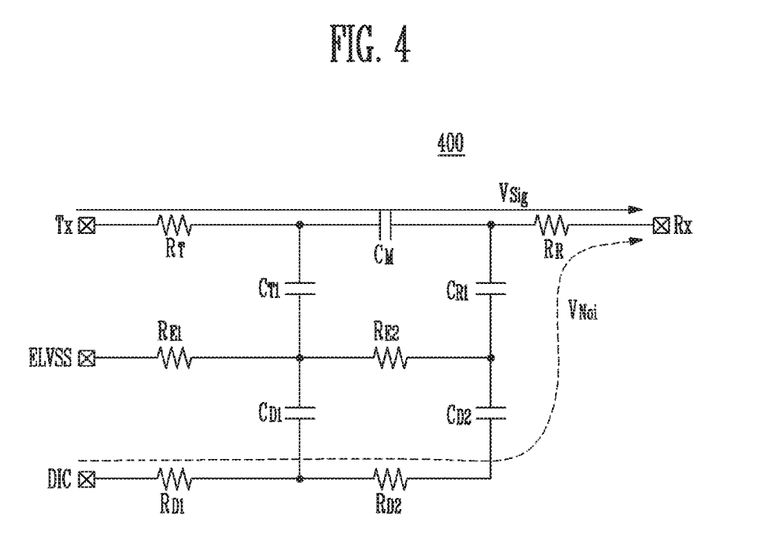
FIG. 4 is an equivalent circuit diagram for describing an input of noise of the touch panel unit.

FIG. 4 is an equivalent circuit diagram for describing an input of noise of the touch panel unit.

FIG. 4 illustrates a model of an equivalent circuit 400, in which a path of a driving signal VSig of the touch panel unit and a path of a noise signal VNoi from a driver IC DIC of the display device are illustrated. Similar to FIG. 3, in the equivalent circuit 400 of FIG. 4, a path through which the driving signal VSig input into the touch panel unit through the first electrode Tx is output to the second electrode Rx connected with the sensing unit is illustrated. FIG. 4 illustrates a resistance component RT of the first electrode Tx, mutual capacitance CM between the first electrode Tx and the second electrode Rx, and a resistance component RR of the second electrode Rx. Further, FIG. 4 illustrates resistance components RE1 and RE2 of an ELVSS line and mutual capacitances CT1 and CR1 formed between the ELVSS line and the first electrode and the second electrode. In the meantime, FIG. 4 illustrates internal resistance components RD1 and RD2 of the driver IC DIC of the display device, and capacitances CD1 and CD2 formed between the driver IC and the ELVSS line.

The driving signal VSig input through the first electrode Tx is transmitted to the second electrode Rx through the resistance component RT of the first electrode, the mutual capacitance CM generated by the first electrode Tx and the second electrode Rx, and the resistance component RR of the second electrode Rx. In the meantime, the noise signal VNoi generated by the driver IC DIC of the display device may be transmitted to the second electrode RX through the internal resistance components RD1 and RD2 within the driver IC DIC, the capacitances CD1 and CD2 present between the driver IC and the ELVSS line, and the mutual capacitances CT1 and CR1 present between the ELVSS line and the first electrode or the second electrode. That is, the signal received by the second electrode RX is a signal, in which the driving signal VSig is combined with the noise signal VNoi. Accordingly, when the noise signal VNoi component is removed from the second electrode Rx terminal, an SNR is improved, thereby improving an operation characteristic of the touch sensing device.

The touch sensing device according to the exemplary embodiment of the present inventive concept detects noise from the first electrode Tx and applies the detected noise to the touch sensing unit, and the touch sensing unit subtracts the detected noise from the signal received from the reception electrode Rx, thereby preventing a saturation phenomenon while improving an SNR. A touch sensing device according to an exemplary embodiment of the present inventive concept will be described below with reference to FIGS. 5 and 6.

Figure 5:
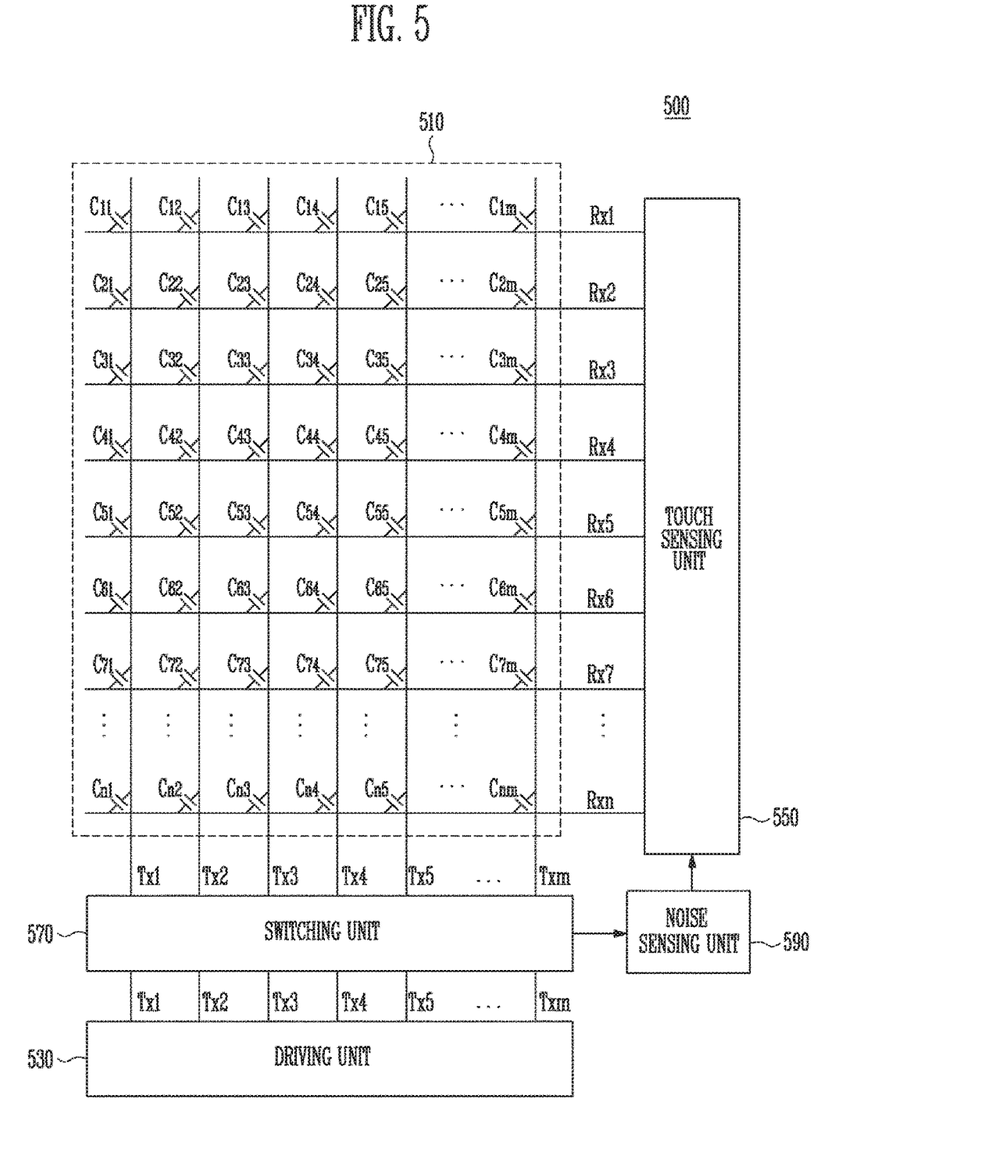
FIG. 5 is a block diagram illustrating a touch sensing device according to an exemplary embodiment of the present inventive concept.

FIG. 5 is a block diagram illustrating a touch sensing device according to an exemplary embodiment of the present inventive concept.

Referring to FIG. 5, a touch sensing device 500 according to an exemplary embodiment of the present inventive concept includes a touch panel unit 510, a driving unit 530, a touch sensing unit 550, a switching unit 570, and a noise sensing unit 590. Similar to FIG. 2, the touch panel unit 510 includes m first electrodes Tx1 to Txm extending in a first axis direction, that is, a vertical direction of FIG. 2, and n second electrodes Rx1 to Rxn extending in a second axis direction crossing the first axis, that is, a horizontal direction of FIG. 2, and capacitance changes in the capacitors C11 to Cnm are formed at a plurality of nodes at which the first electrodes cross the second electrodes. The capacitance changes in the capacitors C11 to Cnm may be mutual-capacitance changes generated by driving signals applied to the first electrodes Tx1 to Txm by the driving unit 530. In the meantime, the driving unit 530 and the touch sensing unit 550 may be implemented as one controller integrated circuit (IC) chip.

The driving unit 530 applies a predetermined driving signal to the first electrodes Tx1 to Txm of the touch panel unit 510. The driving signal may be a square wave, a sine wave, a triangle wave, and the like having a predetermined cycle and a predetermined amplitude, and may be sequentially applied to each of the plurality of first electrodes Tx1 to Txm. The driving unit 530 may be configured so that a circuit for generating and applying the driving signal is individually provided in each of the first electrodes Tx1 to Txm, and may be configured so that one driving signal generating circuit is provided, and the driving signal is applied to each of the plurality of first electrodes Tx1 to Txm by using a switching circuit. Further, as illustrated in FIG. 5, the driving signal generated by the driving unit 530 may be transmitted to the touch panel unit 510 via the switching unit 570, and depending on an exemplary embodiment, the driving unit 530 may be directly connected with the touch panel unit 510 to supply the driving signal to the plurality of first electrodes Tx1 to Txm.

The switching unit 570 may transmits the driving signal generated by the driving unit 530 to the first electrodes Tx1 to Txm of the touch panel unit 510 through the switching circuit. However, depending on an exemplary embodiment, the driving signal may be supplied to the first electrodes Tx1 to Txm of the touch panel unit 510 from the driving unit 530 without passing through the switching unit 570. In the meantime, the switching unit 570 may connect any one of the first electrodes Tx1 to Txm of the touch panel unit 510 to the noise sensing unit 590 through the switching circuit. Accordingly, a noise signal present in the first electrodes Tx1 to Txm within the touch panel unit 510 may be transmitted to the noise sensing unit 590.

An operation of the switching unit 570 will be described in more detail. The switching unit 570 may connect the first electrode, which does not receive the driving signal generated by the driving unit 530 among the first electrodes Tx1 to Txm of the touch panel unit 510, to the noise sensing unit 590. The reason is that only the noise signal cannot be transmitted through the first electrode to which the driving signal is transmitted to the noise sensing unit 590. The driving signal generated by the driving unit 530 is sequentially transmitted to the first electrodes Tx1 to Txm. For example, when the driving signal is being transmitted through the first electrode Tx1, the driving signal is not transmitted to the remaining first electrodes Tx2 to Txm, and only the noise signal component is present in the remaining first electrodes Tx2 to Txm. Accordingly, when the driving signal is being transmitted through the first electrode Tx1, the switching unit 570 may connect any one of the remaining first electrodes Tx2 to Txm to the noise sensing unit 590. Accordingly, when the driving signal is being transmitted through the first electrode Tx1, the switching unit 570 may connect any one of the remaining first electrodes Tx2 to Txm to the noise sensing unit 590.

The first electrode connected to the noise sensing unit 590 may be selected by various methods according to an exemplary embodiment. For example, when the first electrode, to which the driving signal is supplied, is spatially adjacent to a first electrode in which the noise component is measured, the noise component may be similar to actual noise when a driving signal is being transmitted through the first electrode in which the noise component is measured. Accordingly, when the driving signal is being transmitted through the $i^{th}$ first electrode Txi, the switching unit 570 may connect the $i+1^{th}$ first electrode Tx[i+1] or the $i-1^{th}$ first electrode Tx[i−1] to the noise sensing unit 590. In which when the driving signal is being transmitted through the $m^{th}$ first electrode Txm, the $m+1^{th}$ first electrode is not present, so that the switching unit 570 may connect the $i-1^{th}$ first electrode Tx[i−1] to the noise sensing unit 590. In the meantime, depending on an exemplary embodiment, for the predetermined kth first electrode Txk, when the driving signal is being transmitted to other first electrodes Tx1 to Tx[k−1], and Tx[k+1] to Txm, not the $k^{th}$ first electrode Txk, the switching unit may be configured so as to fixedly connect the $k^{th}$ first electrode Txk to the noise sensing unit 590, and when the driving signal is being transmitted to the $k^{th}$ first electrode Txk, the switching unit 570 may be configured so as to connect the predetermined other first electrode to the noise sensing unit 590. That is, the switching unit 570 may connect the first electrode, other than the first electrode to which the driving signal is supplied, to the noise sensing unit 590.

The noise sensing unit 590 may sense noise supplied from the first electrode connected through the switching unit 570. In one exemplary embodiment, the noise sensing unit 590 may be configured to include an integration circuit. In this case, noise charges received from the first electrode may be integrated by the integration circuit and transmitted to the touch sensing unit 550. In the meantime, a size of the noise component received from the first electrode may be amplified or damped according to capacitance of a capacitor or resistance of a resistor included in the integration circuit 620 and transmitted to the touch sensing unit 550. Accordingly, the capacitance of the capacitor within the integration circuit included in the noise sensing unit 590 may be determined by a value experimentally obtained under a predetermined condition. An exemplary embodiment of the noise sensing unit 590 will be described below with reference to FIG. 6.

The touch sensing unit 550 may include an integration circuit for sensing the capacitance changes in the capacitors C11 to Cmn generated at the plurality of nodes, and the integration circuit may be connected to the plurality of second electrodes Rx1 to Rxn. Further, the touch sensing unit 550 may receive a noise signal form the noise sensing unit 590. The noise signal received from the noise sensing unit 590 may be input into the integration circuit 660 included in the touch sensing unit 550. The integration circuit may include at least one operational amplifier and a capacitor having a predetermined capacity, and an inverted input terminal of the operational amplifier may be connected with the second electrodes Rx1 to Rxn and convert the capacitance changes in the capacitors C11 to Cmn into analog signals, such as voltage signals, and output the analog signals. When the driving signal is sequentially applied to each of the plurality of first electrodes Tx1 to Txm, the touch sensing unit 550 may simultaneously detect the capacitance change from the plurality of second electrodes Rx1 to Rxn, so that the integration circuits may be provided as many as the number n of second electrodes Rx1 to Rxm. In this case, the noise signal received from the noise sensing unit 590 may be input into the n integration circuits. More particularly, the plurality of second electrodes Rx1 to Rxn may be connected to inverted input terminals of the n integration circuits 660, respectively, and the noise signal received from the noise sensing unit 590 may be input into non-inverted input terminals of the n integration circuits.

The noise sensing unit 590 may sense the noise received from the first electrode connected through the switching unit 570, and transmit only one noise signal to the touch sensing unit 550. In this case, the noise signals having the same size are equally input into the n integration circuits connected to the plurality of second electrodes Rx1 to Rxn. However, the noise component of the signal transmitted to the second electrode may be varied depending on a position of the touch panel 510, particularly, a position of the first electrode. For example, when the driving signal is transmitted through Tx3, a size of the noise signal transmitted through the second electrode Rx1 positioned at an upper end of the touch panel unit 510 may be different from a size of the noise signal transmitted through the second electrode Rxn positioned at a lower end of the touch panel 510. In many cases, a size of the noise signal included in the second electrode Rxn at a location close to the driving unit 530 may be relatively small, and a size of the noise signal included in the second electrode Rx1 at a location far from the driving unit 530 may be relatively large. Accordingly, when the noise signals having the same size are equally input into the n integration circuits connected to the plurality of second electrodes Rx1 to Rxn, an influence of noise is different according to the location, so that performance of the touch sensing device may be degraded. Accordingly, the sizes of the noise components input into the n integration circuits connected to the plurality of second electrodes Rx1 to Rxn may be differently set. The method of differently setting the sizes of the noise components input into the n integration circuits connected to the plurality of second electrodes Rx1 to Rxn may be variously implemented according to an exemplary embodiment. For example, the noise sensing unit 590 transmits the noise signals having the same size to the touch sensing unit 550, and amplifiers having different gains may be additionally included in the non-inverted input terminals of the n integration circuits within the touch sensing unit 550 connected to the plurality of second electrodes Rx1 to Rxn. When the second electrodes Rx1 to Rxn are far from the switching unit 570, the gain of the amplifier connected to the integration circuit may be increased. In the meantime, in another exemplary embodiment, the noise sensing unit 590 may be configured to generate a plurality of noise signals having different sizes and transmit the generated noise signals to the touch sensing unit 550.

Although not illustrated in FIG. 5, the touch sensing device may further include a signal converting unit and a calculating unit, in addition to the touch panel unit 510, the driving unit 530, the touch sensing unit 550, the switching unit 570, and the noise sensing unit 590. The signal converting unit may generate a digital signal from an analog signal generated by the integration circuit. For example, the signal converting unit may include a Time-to Digital Converter (TDC) circuit which measures a time of arrival of an analog signal in a form of a voltage output by the touch sensing unit 550 to a predetermined reference voltage level and converts the measured time into a digital signal, or an Analog-To-Digital Converter (ADC) circuit which measures the amount of change of a level of an analog signal output by the touch sensing unit 550 for a predetermined time, and converts the measured amount of change into a digital signal. The signal converting unit and the calculating unit may also be separately implemented from the touch sensing unit 550, and may also be implemented while being integrated with the touch sensing unit 550 according to an exemplary embodiment.

Figure 6:
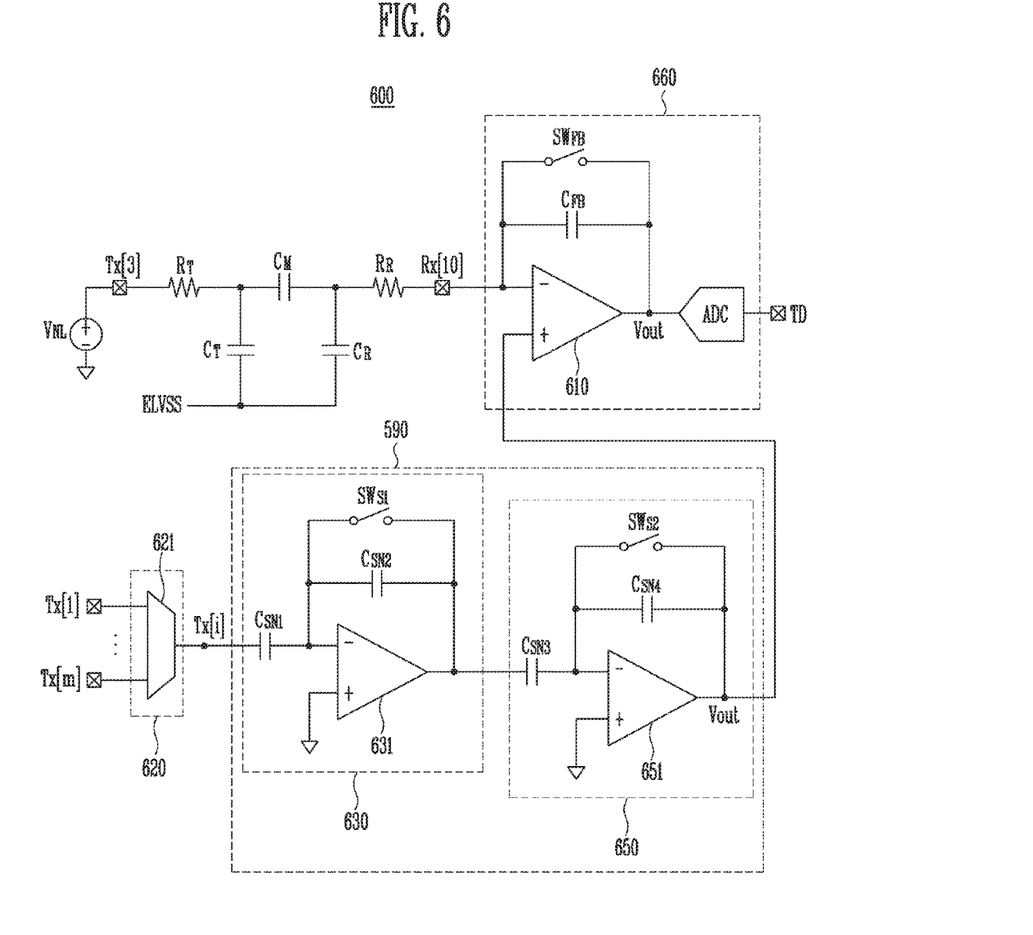
FIG. 6 is an equivalent circuit diagram illustrating a path of a driving signal and noise in the touch sensing device according to the exemplary embodiment of the present inventive concept.

FIG. 6 is an equivalent circuit diagram illustrating a path of a driving signal and noise in the touch sensing device according to the exemplary embodiment of the present inventive concept. Particularly, FIG. 6 is an equivalent circuit diagram in a case where a driving signal is applied to the third first electrode Tx[3] and is transmitted to the tenth second electrode Rx[10].

Referring to FIG. 6, a driving signal VNL generated by the driving unit is applied to the third first electrode Tx[3]. Similar to FIG. 3, RT represents a resistance component of the first electrode corresponding to a touch position, CM represents mutual capacitance between the first electrode and the second electrode, and RR represents a resistance component of the second electrode corresponding to the touch position. Further, CT represents capacitance between the entire first electrodes corresponding to the touch position and driving power ELVSS line, and CR represents capacitance between the entire second electrodes corresponding to the touch position and the driving power ELVSS line.

The driving signal VNL applied to the third first electrode Tx[3] is transmitted to the tenth second electrode Rx[10] via RT, CM, and RR. As described with reference to FIG. 3, the noise component transmitted through the ELVSS line is also transmitted to the tenth second electrode Rx[10] via CT, CR, and the like.

In the drawing illustrated in FIG. 6, the equivalent circuit 600 may include a switching unit 620 and a noise sensing unit 590. The noise sensing unit may include a first integration circuit 630 and a second integration circuit 650. The switching unit 620 may be implemented by a multiplexer (MUX), and may connect to one of the plurality of first electrodes Tx[1] to Tx[m] to the first integration circuit 630. In the drawing illustrated in FIG. 6, the $i^{th}$ first electrode Tx[i] is connected to the first integration circuit 630.

The first integration circuit 630 may include a first operational amplifier 631, first capacitors CSN1 and CSN2, and a first switch SWS1. The second integration circuit 650 may include a second operational amplifier 651, second capacitors CSN3 and CSN4, and a first switch SWS2. A noise signal, of which a polarity is reversed, is output through the first integration circuit 630, and the second integration circuit 650 reverses the polarity of the noise signal again and outputs the noise signal. Accordingly, the noise signal output from the second integration circuit 650 maintains an original polarity, and is input into the integration circuit within the touch sensing unit 550 connected to the tenth second electrode Rx[10]. More particularly, the noise signal output from the second integration circuit 650 is input into a non-inverted terminal of the operational amplifier 610 included in the integration circuit within the touch sensing unit 550. A driving signal including the noise is input into an inverted input terminal of the operational amplifier 610. Accordingly, the integration circuit 660 including the operational amplifier 610, the feedback capacitor CFB, and the feedback switch SWFB outputs a driving signal component, in which the noise component sensed by the noise sensing unit is removed, to an output terminal Vout. The output signal is converted into a digital signal TD through an ADC.

As described above, the touch sensing device according to the exemplary embodiment of the present inventive concept may detect a noise within the touch panel unit by the switching unit and the noise sensing unit, and remove the detected noise component from the reception signal by the touch sensing unit, thereby more accurately sensing a touch.

In the meantime, the touch sensing device may be combined with a display device, or integrally included in a display device. In this case, the touch panel unit may be implemented as a touch screen panel integrally manufactured with a display panel. A noise generated by a driver IC DIC of the display device may be input into the touch sensing device, and the touch sensing device according to the present inventive concept may detect noise within a touch screen panel by the switching unit and the noise sensing unit, and removing the detected noise component from a reception signal by the touch sensing unit, thereby more accurately sensing a touch. Accordingly, it is possible to provide a touch panel integrated display device with improved touch accuracy.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present inventive concept as set forth in the following claims.

What is claimed is:

1. A touch sensing device, comprising:
a touch panel unit including first electrodes and second electrodes;
a driving unit configured to generate a driving signal for detecting a change in capacitance within the touch panel unit;
a switching unit configured to transmit the driving signal generated by the driving unit to any one of the first electrodes of the touch panel unit, and receive noise from another one of the first electrodes of the touch panel unit;
a noise sensing unit configured to sense the noise received from the switching unit; and
a touch sensing unit configured to detect a touch position based on detection signals received through the second electrodes of the touch panel unit and the noise sensed by the noise sensing unit,
wherein the switching unit receives the noise through the another one of the first electrodes which is not supplied with the driving signal and disposed adjacent to the any one of the first electrodes which is supplied with the driving signal,
wherein the noise sensing unit includes a first integration circuit and a second integration circuit which are serially connected with the switching unit, and reverses a polarity of a noise signal transmitted through the switching unit,
wherein the first integration circuit and the second integration circuit include a first operational amplifier and a second operational amplifier, respectively, and
wherein the noise signal transmitted through the switching unit is transmitted to an inverted input terminal of the first operational amplifier, and a signal output through an output terminal of the first operational amplifier is transmitted to an inverted input terminal of the second operational amplifier.

2. The touch sensing device of claim 1, wherein the switching unit sequentially supplies the driving signal generated by the driving unit to the first electrodes within the touch panel unit.

3. The touch sensing device of claim 2, wherein the switching unit receives the noise through a first electrode which is disposed right after the first electrode which is supplied with the driving signal.

4. The touch sensing device of claim 2, wherein the switching unit receives the noise through a first electrode which is disposed right before the first electrode which is supplied with the driving signal.

5. The touch sensing device of claim 1, wherein the touch sensing unit includes a plurality of third operational amplifiers connected to the second electrodes, respectively,
inverted input terminals of the plurality of third operational amplifiers are connected to the corresponding second electrodes, and
non-inverted input terminals of the plurality of third operational amplifiers are connected to an output terminal of the second operational amplifier of the noise sensing unit.

6. The touch sensing device of claim 5, wherein output terminals of the plurality of third operational amplifiers are connected to a respective Analog-to-Digital Converter (ADC).

7. A display device, comprising:
a touch screen panel including first electrodes and second electrodes;
a driving unit configured to generate a driving signal for detecting a change in capacitance within the touch screen panel;
a switching unit configured to transmit the driving signal generated by the driving unit to any one of the first electrodes of the touch screen panel, and receive noise from another one of the first electrodes of the touch screen panel;
a noise sensing unit configured to sense the noise received from the switching unit; and
a touch sensing unit configured to detect a touch position based on detection signals received through the second electrodes of the touch screen panel and the noise sensed by the noise sensing unit,
wherein the switching unit receives the noise through the first electrode not being supplied with the driving signal and disposed adjacent to a first electrode which is supplied with the driving signal,
wherein the noise sensing unit includes a first integration circuit and a second integration circuit which are serially connected with the switching unit,
wherein the first integration circuit and the second integration circuit include a second operational amplifier and a third operational amplifier, respectively, and
wherein the noise received from the another one of the first electrodes is supplied to an inverted input terminal of the second operational amplifier, and a signal output through an output terminal of the second operational amplifier is supplied to an inverted input terminal of the third operational amplifier.

8. The display device of claim 7, wherein the switching unit connects any one of the first electrodes which is not supplied with the driving signal to the noise sensing unit.

9. The display device of claim 8, wherein the touch sensing unit includes a plurality of first operational amplifiers connected to the second electrodes, respectively, and
wherein inverted input terminals of the plurality of the first operational amplifiers are connected to the corresponding second electrodes, and non-inverted input terminals of the plurality of the first operational amplifiers are connected to an output terminal of the noise sensing unit.

10. The display device of claim 7, wherein the switching unit receives the noise through a first electrode which is disposed right after a first electrode which is supplied with the driving signal.

11. The display device of claim 7, wherein the switching unit receives the noise through a first electrode which is disposed right before a first electrode which is supplied with the driving signal.

\* \* \* \* \*